(12) United States Patent
Lee et al.

(10) Patent No.: US 10,274,743 B2
(45) Date of Patent: Apr. 30, 2019

(54) IMAGING SYSTEM

(71) Applicants: HYUNDAI MOTOR COMPANY, Seoul (KR); SOGANG UNIVERSITY RESEARCH FOUNDATION, Seoul (KR)

(72) Inventors: Sang Heun Lee, Seoul (KR); Sung-Hoon Jeon, Seoul (KR); Hanju Lee, Seoul (KR); Hyun-Wook Jang, Seoul (KR); Kiejin Lee, Seoul (KR); Do-Suck Han, Seongnam-si (KR)

(73) Assignees: Hyundai Motor Company, Seoul (KR); Sogang University Research Foundation, Seoul (KR)

( * ) Notice: Subject to any disclaimer, the term of this patent is extended or adjusted under 35 U.S.C. 154(b) by 177 days.

(21) Appl. No.: 15/385,288

(22) Filed: Dec. 20, 2016

(65) Prior Publication Data
US 2018/0091239 A1 Mar. 29, 2018

(30) Foreign Application Priority Data
Sep. 27, 2016 (KR) .................. 10-2016-0123887

(51) Int. Cl.
*G02B 27/28* (2006.01)
*G02F 1/01* (2006.01)
(Continued)

(52) U.S. Cl.
CPC .......... *G02B 27/286* (2013.01); *G02F 1/009* (2013.01); *G02F 1/0131* (2013.01); *G02F 1/0136* (2013.01); *G01L 1/241* (2013.01)

(58) Field of Classification Search
None
See application file for complete search history.

(56) References Cited

U.S. PATENT DOCUMENTS

2001/0036465 A1* 11/2001 Ishll .................. H01J 37/32192
424/400
2002/0184426 A1* 12/2002 Otsuka ................ G06F 13/4086
710/305
(Continued)

FOREIGN PATENT DOCUMENTS

CN 103138848 B * 1/2015
EP 0977044 A1 * 2/2000 ............. G01R 29/10
(Continued)

OTHER PUBLICATIONS

Lee H, Arakelyan S, Friedman B, Lee K. Temperature and microwave near field imaging by thermo-elastic optical indicator microscopy. Scientific reports. Dec. 22, 2016;6:39696. (Year: 2016).*
(Continued)

*Primary Examiner* — Michelle M Entezari
(74) *Attorney, Agent, or Firm* — Morgan Lewis & Bockius LLP

(57) ABSTRACT

An imaging system includes an indicator installed around an antenna, wherein optical characteristics of the indicator change as a function of an electromagnetic field formed by the antenna, an imaging apparatus for imaging a change in optical characteristics of the indicator, a transmitter for radiating radio waves toward the antenna, and a receiver for receiving a signal from the antenna.

19 Claims, 22 Drawing Sheets

(51) Int. Cl.
*G02F 1/00* (2006.01)
*G01L 1/24* (2006.01)

(56) References Cited

U.S. PATENT DOCUMENTS

| | | | |
|---|---|---|---|
| 2004/0131301 A1* | 7/2004 | Liang | G01R 29/0885 385/12 |
| 2006/0180764 A1* | 8/2006 | Yajima | B60R 21/01534 250/349 |
| 2007/0202811 A1* | 8/2007 | Chanowitz | H04B 5/0062 455/67.12 |
| 2010/0149038 A1* | 6/2010 | Brown | G01R 29/10 342/360 |
| 2011/0006911 A1* | 1/2011 | Wilbur | H01Q 9/285 340/870.02 |
| 2011/0077639 A1* | 3/2011 | Brannan | A61B 18/1815 606/33 |
| 2014/0018677 A1* | 1/2014 | Sharonov | A61B 18/12 600/438 |
| 2014/0103919 A1* | 4/2014 | Joisten | G02F 1/09 324/244.1 |

FOREIGN PATENT DOCUMENTS

| | | |
|---|---|---|
| JP | 2014-228338 A | 12/2014 |
| KR | 10-2016-0107921 A | 9/2016 |
| KR | 10-2016-0107924 A | 9/2016 |

OTHER PUBLICATIONS

Amineh RK, Ravan M, Trehan A, Nikolova NK. Near-field microwave imaging based on aperture raster scanning with TEM horn antennas. IEEE Transactions on Antennas and Propagation. Mar. 2011;59(3):928-40. (Year: 2011).*

Yaghjian, Arthur. "An overview of near-field antenna measurements." IEEE Transactions on antennas and propagation 34.1 (1986): 30-45. (Year: 1986).*

Machine Translation of CN 103138848 B (Year: 2015).*

Korean Notice of Allowance issued in corresponding Korean Patent Application No. 10-2016-0123887, dated Nov. 20, 2017.

* cited by examiner

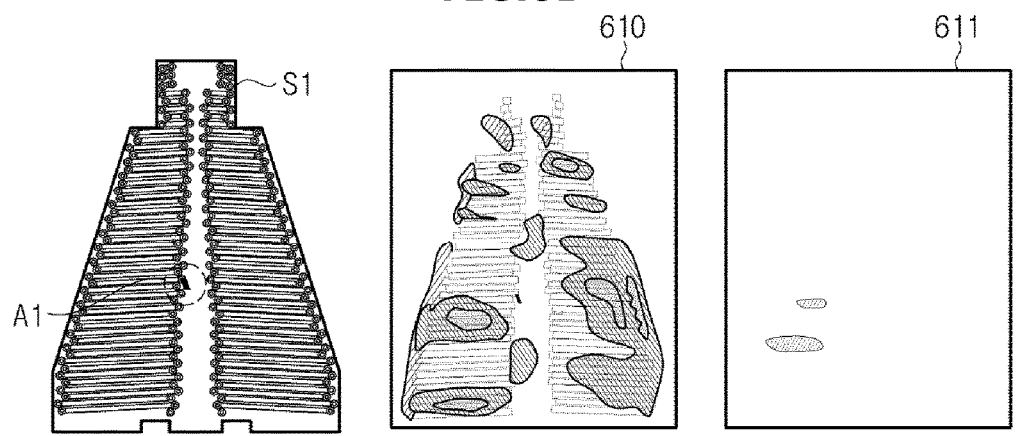

IMAGING SYSTEM

CROSS-REFERENCE TO RELATED APPLICATION

This application claims the benefit of priority to Korean Patent Application No. 10-2016-0123887, filed on Sep. 27, 2016 with the Korean Intellectual Property Office, the disclosure of which is incorporated herein by reference.

TECHNICAL FIELD

Embodiments of the present disclosure relate to an imaging system, and more particularly, to an imaging system using a photoelastic effect.

BACKGROUND

With rapid developments of information and communication technologies, the demand for wideband communications system based on a high-frequency band is sharply increasing. Accordingly, a technique for verifying and inspecting microwave devices, such as with antennas, is required.

As a method for inspecting the characteristics of antennas, a technique for imaging the electromagnetic fields of antennas attracts interest, and various scanning and optical techniques for implementing the imaging technique are being developed.

A known method is a technique of measuring an electromagnetic field using a scanning probe. However, the technique of measuring an electromagnetic field using a scanning probe requires a long measurement time, and it is difficult to design a probe for such measurement.

As another method, an optical indicator method using the electro-optical effect and the magneto-optical effect is known. However, the optical indicator method requires a material having the electro-optical effect or the magneto-optical effect, needs synchronization of an electromagnetic field with optical signals for measurement, has a limited bandwidth and/or requires an external magnetic field.

SUMMARY

Therefore, it is an aspect of the present disclosure to provide an imaging system using a photoelastic effect.

It is another aspect of the present disclosure to provide an imaging system capable of quickly imaging an electromagnetic field.

It is an aspect of the present disclosure to provide an imaging system capable of imaging an electromagnetic field over a wide area.

It is an aspect of the present disclosure to provide an imaging system capable of imaging an electromagnetic field of an antenna without disassembling the antenna.

Additional aspects of the disclosure will be set forth in part in the description which follows and, in part, will be obvious from the description, or may be learned by practice of the disclosure.

In accordance with one aspect of the present disclosure, an imaging system may include an indicator installed around an antenna, wherein optical characteristics of the indicator change by, or as a function of, an electromagnetic field formed by the antenna, an imaging apparatus configured to image a change in optical characteristics of the indicator, a transmitter configured to radiate radio waves toward the antenna, and a receiver configured to receive a signal from the antenna.

The indicator may include a loss film which is partially heated by the electromagnetic field formed by the antenna, and a photoelastic plate, wherein optical characteristics of a part of the photoelastic plate may change by the partial heating of the loss film.

The photoelastic plate may be partially heated by the partial heating of the loss film, and optical characteristics of the partially heated part of the photoelastic plate may change by a photoelastic effect.

Double refraction may occur in the part of the photoelastic plate where the optical characteristics of the photoelastic plate change.

The imaging apparatus may include a light source configured to generate light, a linear polarizer configured to linearly polarize the light generated by the light source, a circular polarizer configured to circularly polarize the linearly polarized light, a beam splitter configured to cause the circularly polarized light to be incident to the indicator, an analyzer configured to linearly polarize light passed through the indicator, and a camera configured to receive light passed through the analyzer.

Light passed through a part of the indicator where the optical characteristics of the indicator change may be elliptically polarized.

The imaging apparatus may further include a controller configured to process an image acquired by the camera, and to create a sample image representing an electromagnetic field formed by the antenna, and a storage device configured to store the sample image representing the electromagnetic field formed by the antenna.

The camera may acquire a first image when a polarization direction of the analyzer is at an angle of 45 degrees with respect to a polarization direction of the linear polarizer, and a second image when the polarization direction of the analyzer is at an angle of 90 degrees with respect to the polarization direction of the linear polarizer.

The controller may generate the sample image representing the electromagnetic field formed by the antenna from the first image and the second image.

The controller generates a difference image representing a difference between the sample image and a reference image stored in the storage device.

The transmitter may sequentially radiate radio waves having different frequencies, and the controller may generate a plurality of images representing the electromagnetic field formed by the antenna according to the radio waves having the different frequencies.

The imaging system may include a support table configured to translate the antenna. The controller may generate a plurality of images representing the electromagnetic field formed by the antenna, according to a plurality of different distances between the antenna and the indicator.

The imaging system may include a support table configured to rotate the antenna. The controller may generate a plurality of images representing the electromagnetic field formed by the antenna by rotating the antenna.

The imaging system may include another transmitter configured to radiate radio waves having a frequency that is different from a frequency of the radio waves radiated from the transmitter.

When the transmitter and the other transmitter radiate the radio waves of the different frequencies, the imaging apparatus may image an electromagnetic field formed by a plurality of antennas included in the antenna.

In accordance with one aspect of the present disclosure, an imaging system may include an indicator disposed around an antenna, wherein optical characteristics of the indicator change by, or as a function of, an electromagnetic field formed by the antenna, an imaging apparatus configured to image a change in optical characteristics of the indicator, and a network analyzer configured to radiate radio waves toward the antenna, and to receive a signal from the antenna.

The network analyzer may sense intensity of the signal received from the antenna while changing a frequency of the electromagnetic waves, and calculate a reception rate of the antenna according to frequency, based on the sensed intensity of the signal.

The imaging system may further include comprising a support table configured to rotate the antenna. The network analyzer may sense intensity of the signal received from the antenna while the support table rotates the antenna, and calculate a radiation pattern of the antenna based on the sensed intensity of the signal.

The network analyzer may simultaneously radiate a plurality of radio waves having different frequencies and receive a signal from a plurality of antennas included in the antenna.

In accordance with one aspect of the present disclosure, an imaging system may include an indicator disposed around an antenna configured to receive radio waves, wherein the indicator is heated by an electromagnetic field formed by the antenna, and an imaging apparatus configured to irradiate circularly polarized light toward the indicator, and to image heat distribution of the indicator using light passed through the indicator.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 6A, 6B, 6C, 6D, 7A, 7B, 7C, 8A, 8B and 8C show images of samples, acquired by an imaging apparatus included in an imaging system according to exemplary embodiments of the present disclosure;

DETAILED DESCRIPTION

Figure 1:
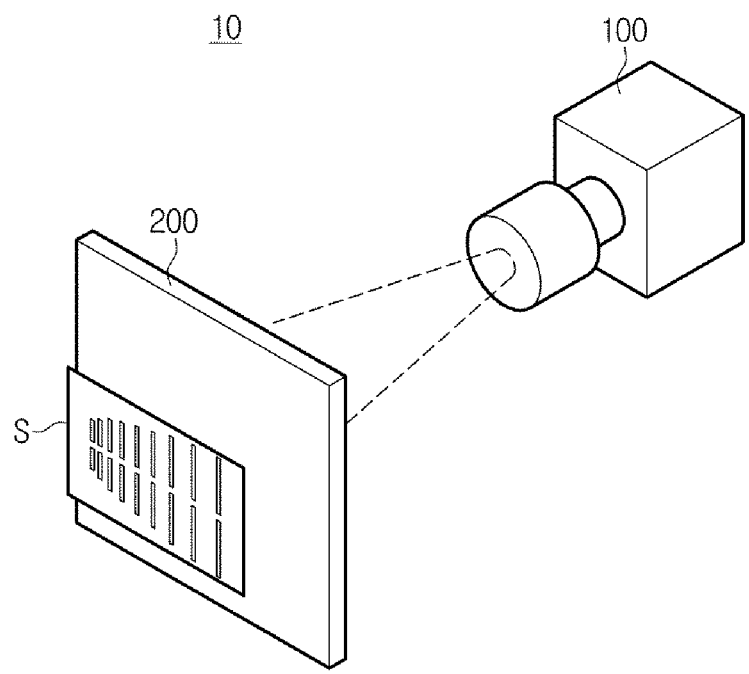
FIG. 1 shows an example of an imaging system according to exemplary embodiments of the present disclosure.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an" and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

Hereinafter, an operation principle and embodiments of the present disclosure will be described with reference to the accompanying drawings.

FIG. 1 shows an example of an imaging system according to exemplary embodiments of the present disclosure.

As shown in FIG. 1, an imaging system 10 may include an indicator 200 placed around a target sample S that is to be examined, and an imaging apparatus 100 configured to acquire an image of the indicator 200.

The indicator 200 may be placed around the target sample S, and may contact or not contact the target sample S. For example, since an electromagnetic field (that is, a near field) of the target sample S is formed at a predetermined distance from the target sample S, the indicator 200 may be spaced by the predetermined distance apart from the target sample S.

Also, the optical characteristics of the indicator 200 may change by the near field formed around the target sample S. For example, heat may be generated in a part of the indicator 200 by the near field of the target sample S, so that the optical characteristics of the indicator 200 may change in the part where the heat is generated.

The imaging apparatus 100 can image heat distribution of the indicator 200 by the near field of the target sample S. In other words, the imaging apparatus 100 can image a change in optical characteristics of the indicator 200 caused by heat.

More specifically, the imaging apparatus 100 may irradiate circularly polarized light toward the indicator 200, and the irradiated light may be reflected from the indicator 200. Then, the imaging apparatus 100 may acquire an image from the light reflected from the indicator 200. At this time, due to the change in optical characteristic of the indicator 200, the light reflected from the indicator 200 may have optical characteristics that are different from those of the light incident to the indicator 200. Accordingly, the image acquired by the imaging apparatus 100 may include information about a change in optical characteristics of the indicator 200, that is, information about heat distribution of the indicator 200, wherein the information about the heat distribution of the indicator 200 relates to a near field of the target sample S. As a result, the imaging apparatus 100 may acquire an image including information about the near field of the target sample S.

Hereinafter, a configuration and function of the indicator 200 will be described.

Figure 2:
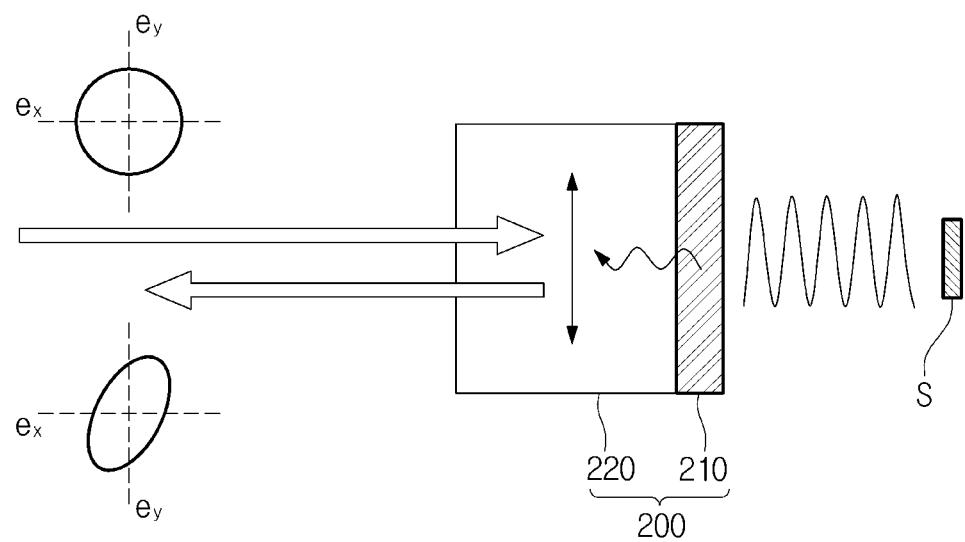
FIG. 2 shows an indicator included in an imaging system according to exemplary embodiments of the present disclosure.

FIG. 2 shows an indicator included in an imaging system according to exemplary embodiments of the present disclosure. Also, FIG. 3 shows the stress of an indicator included in an imaging system according to exemplary embodiments of the present disclosure.

Figure 3:
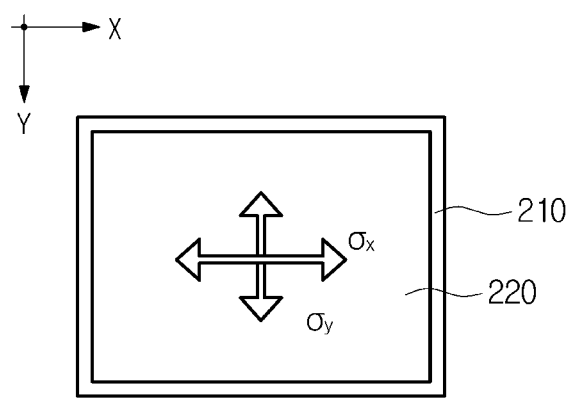
FIG. 3 shows the stress of an indicator included in an imaging system according to exemplary embodiments of the present disclosure.

As shown in FIGS. 2 and 3, the indicator 200 may include a photoelastic plate 210 having photoelasticity, and a loss film 220 having a great, or large, dielectric loss and/or a great, or large, magnetic loss.

The loss film 220 may be made of a material having great dielectric loss and/or great magnetic loss. Due to the dielectric loss and/or magnetic loss, the loss film 220 may generate heat when a magnetic field, an electric field and/or an electromagnetic field is/are formed in the loss film 220. For example, as shown in FIG. 2, if a target sample S is positioned near the loss film 220, and an a magnetic field, an electric field, and/or an electromagnetic field is/are formed around the target sample S, the loss film 220 may generate heat.

More specifically, the energy of an electric field and/or an electromagnetic field propagated in the loss film 220 may dissipate in the form of thermal energy due to the dielectric loss. In other words, if an electric field and/or an electromagnetic field is/are formed around the loss film 220, the loss film 220 may be partially heated due to the electric field and/or the electromagnetic field. A material having great dielectric loss may include a ceramic material, a polar polymer material such as Polymethyl Methacrylate (PMMA), a composite of PMMA and metal nanoparticles, an organic semiconductor and the like.

The energy of the magnetic field and/or the electromagnetic field propagated in the loss film 220 may dissipate in the form of thermal energy due to the magnetic loss. In other words, if a magnetic field and/or an electromagnetic field is/are formed around the loss film 220, the loss film 220 may be partially heated by the magnetic field and/or the electromagnetic field. A material having great magnetic loss may include a magnetic material, metal having great magnetic resistance, and the like.

The loss film 220 may be fabricated by forming a thin film of a material having great dielectric loss and/or great magnetic loss on the photoelastic plate 210. For example, the loss film 220 may be fabricated by thermally depositing or spin-coating a material having great dielectric loss and/or great magnetic loss on the photoelastic plate 210.

The loss film 220 may be made of a material having a high light reflectivity. In this case, light irradiated from the imaging apparatus 100 (see FIG. 1) may pass through the photoelastic plate 210 made of a transparent material, and then be reflected from the loss film 220.

Also, the loss film 220 may be made of a transparent material. In this case, light irradiated from the imaging apparatus 100 (see FIG. 1) may pass through the photoelastic plate 210 and the loss film 220 made of a transparent material, and then may be reflected from the target sample S.

As described above, if an electric field, a magnetic field, and/or an electromagnetic field is/are formed around the target sample S, the loss film 220 may be partially heated due to the dielectric loss and/or magnetic loss, and heat generated in the loss film 220 may be transferred to the photoelastic plate 210.

The photoelastic plate 210 may have a photoelasticity. In other words, the photoelastic plate 210 may generate the photoelastic effect. The photoelastic effect means that the optical characteristics of a material change due to a physical force. For example, if a physical force is applied to a transparent material of glass, plastic, etc., the transparent material may temporarily change to an optically anisotropic material, so that double refraction may occur in the transparent material.

If the heat generated in the loss film 220 is transferred to the photoelastic plate 210, stress may be generated in the photoelastic plate 210 by the heat. For example, as shown in FIG. 3, x-axis stress $\sigma_x$ and y-axis stress $\sigma_y$ may be generated in the photoelastic plate 210.

Due to the partial stress of the photoelastic plate 210, the optical characteristics of a part of the photoelastic plate 210 may change. For example, as shown in FIG. 2, if circularly polarized light is incident to a part of the photoelastic plate 210 where the optical characteristics of the photoelastic plate 210 have changed, the circularly polarized light may change to elliptically polarized light while passing through the part of the photoelastic plate 210. The imaging apparatus 100 (as shown in FIG. 1) may irradiate light on the photoelastic plate 210, and analyze light passed through the photoelastic plate 210 to thereby image a change in optical characteristics of the photoelastic plate 210.

The photoelastic plate 210 may be made of a transparent material so that light irradiated from the imaging apparatus 100 (as shown in FIG. 1) can pass through the photoelastic plate 210. For example, the photoelastic plate 210 may be made of regular glass or borosilicate glass.

As described above, the optical characteristics of a part of the indicator 200 may change due to the near field formed around the target sample S.

Since the change in optical characteristics of the indicator 200 is caused by a heating phenomenon due to a near field formed around the target sample S, the distribution of the near field may be reflected by the distribution of the change in optical characteristics of the indicator 200, regardless of the direction of the near field.

Also, the indicator 200 can be easily fabricated at low costs by coating a polymer thin film, a metal thin film and/or a magnetic material thin film on regular glass.

Hereinafter, configuration and functions of the imaging apparatus 100 will be described.

Figure 4:
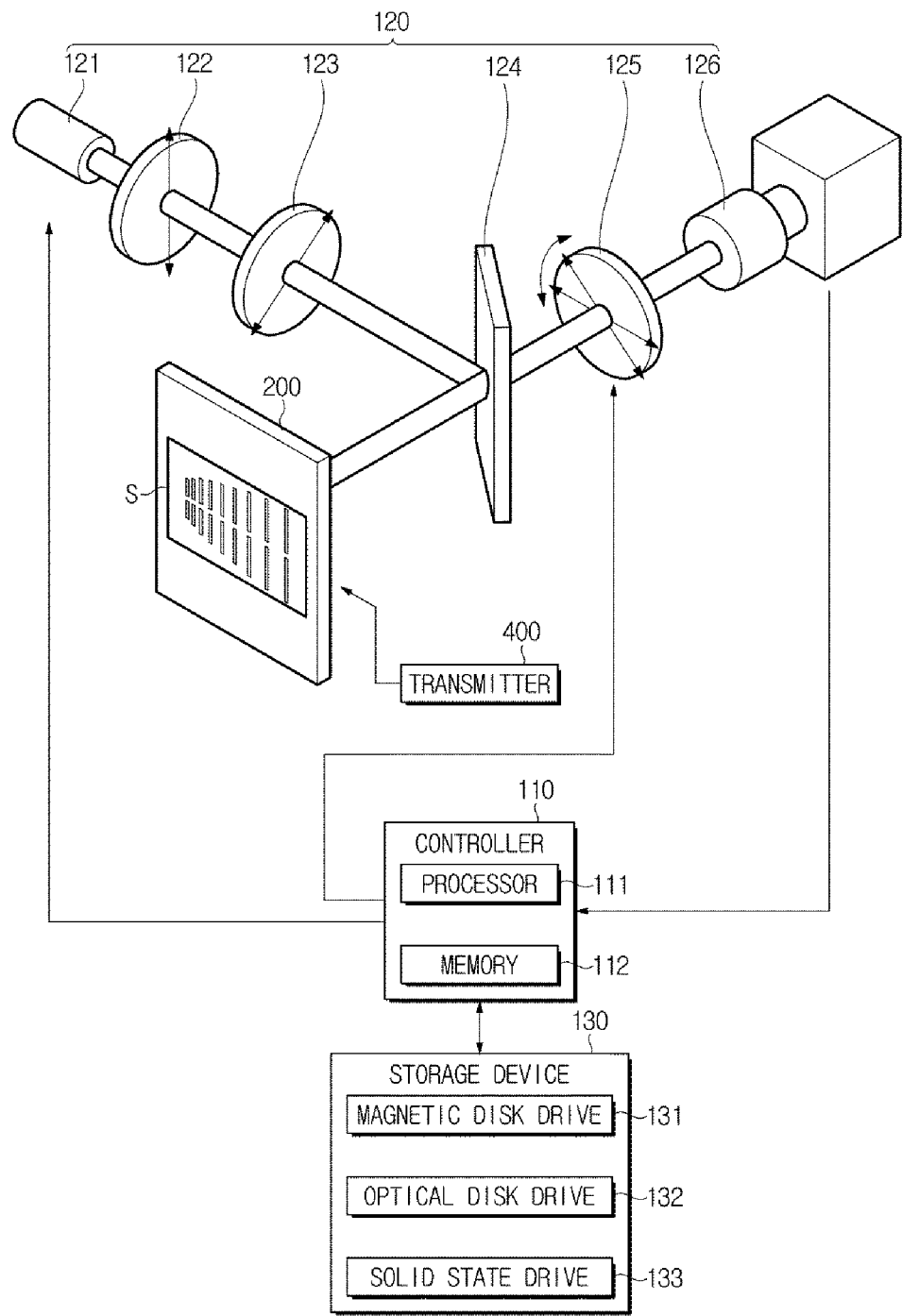
FIG. 4 shows an imaging apparatus included in an imaging system according to exemplary embodiments of the present disclosure.

FIG. 4 shows an imaging apparatus included in an imaging system according to exemplary embodiments of the present disclosure. Also, FIG. 5 shows changes of light irradiated from an imaging apparatus included in an imaging system according to exemplary embodiments of the present disclosure.

Figure 5:
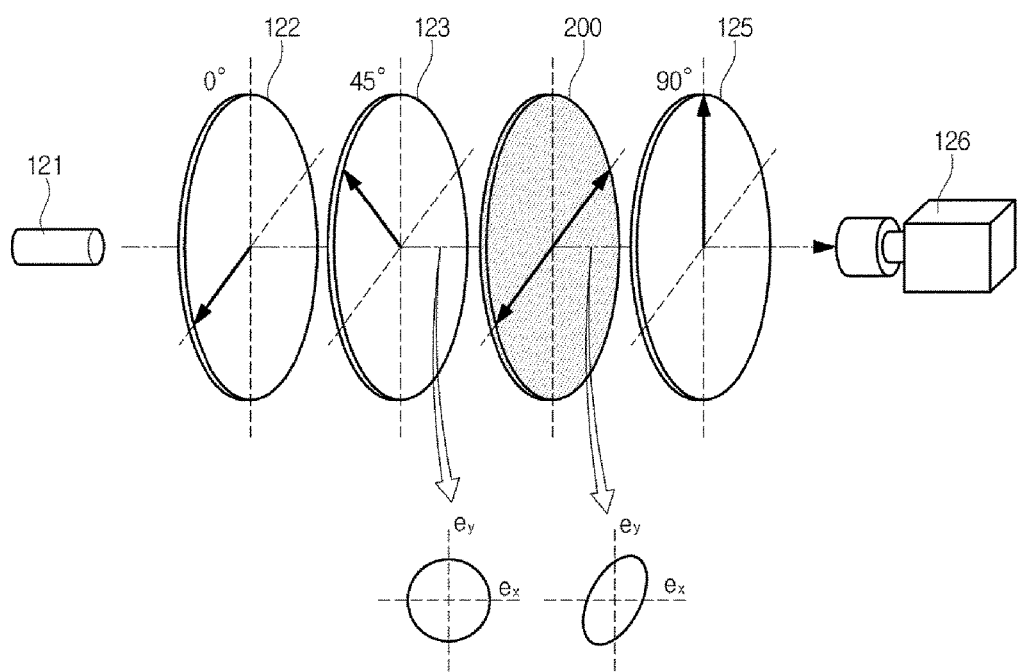
FIG. 5 shows changes of light irradiated from an imaging apparatus included in an imaging system according to exemplary embodiments of the present disclosure.

As shown in FIGS. 4 and 5, the imaging apparatus 100 may include an optical device 120 configured to image a change in optical characteristics of the indicator 200, a storage device 130 configured to store programs and data for controlling operations of the imaging apparatus 100, and a controller 110 configured to control operations of the optical device 120 and to process images acquired by the optical device 120. A target sample S that is to be examined may be placed near the indicator 200, and a transmitter 400 for supplying a signal of a radio frequency to the target sample S may be provided to form a near field around the target sample S.

The optical device 120 may include a light source 121, a linear polarizer 122, a circular polarizer 123, a beam splitter 124, an analyzer 125 and a camera 126.

The light source 121 may generate light for imaging a change in optical characteristics of the indicator 200 (see FIG. 2). The light source 121 may generate light of a specific wavelength. For example, the light source 121 may generate light of 532 nanometers (nm).

The light source 121 may include a halogen lamp, a Light Emitting Diode (LED), a Light Amplified by Stimulated Emission of Radiation (Laser) and the like.

The linear polarizer 122 may transmit light polarized in a specific direction. In other words, the linear polarizer 122 may linearly polarize light generated by the light source 121.

Light is known as electromagnetic waves including a magnetic field and an electric field vibrating in directions that are orthogonal to the propagation direction of the light, wherein the vibration direction of the magnetic field is orthogonal to the vibration direction of the electric field. Also, the electric field and the magnetic field of the light may be represented as an electric field vector and a magnetic field vector on a plane that is orthogonal to the propagation direction of the light.

Also, an electric field and a magnetic field of general light may vibrate in all directions that are orthogonal to the propagation direction of the light. Polarized light means light including an electric field and a magnetic field vibrating in specific directions, or polarization means a phenomenon in which an electric field and a magnetic field constituting light vibrate only in specific directions.

Since the vibration direction of an electric field is orthogonal to the vibration direction of a magnetic field, polarization or polarized light is generally described based on a magnetic field. A magnetic field can be represented by an x-axis component and a y-axis component on a plane that is orthogonal to the propagation direction of light, wherein the x-axis component and the y-axis component have a sine wave whose amplitude changes periodically.

A linear polarization phenomenon is a phenomenon where an electric field and a magnetic field vibrate in specific directions, and the vibration direction of the electric field and the vibration direction of the magnetic field are constant over time. In other words, linearly polarized light represents light in which an electric field and a magnetic field vibrate in specific directions, and the vibration direction of the electric field and the vibration direction of the magnetic field are constant over time.

Also, the x-axis component and the y-axis component of the magnetic field of linearly polarized light may have the same amplitude, the same wavelength and the same phase.

The linear polarizer 122 may transmit light in which an electric field and a magnetic field vibrate in specific directions and the vibration directions of the electric field and the magnetic field do not change over time, from light output from the light source 121.

The linear polarizer 122 may include a polarization film or a liquid crystal modulator (LCM).

The circular polarizer 123 may convert light linearly polarized by the linear polarizer 122 into circularly polarized light.

The linear polarization phenomenon is a phenomenon where an electric field and a magnetic field of light vibrate in specific directions, and the vibration directions of the electric field and the magnetic field are constant over time, as described above. A circular polarization phenomenon is a phenomenon in which an electric field and a magnetic field vibrate in specific directions, and the vibration directions of the electric field and the magnetic field rotate over time. In other words, the electric field and the magnetic field of circularly polarized light may vibrate in specific directions, and the vibration directions of the electric field and the magnetic field may rotate.

In regard to the magnetic field of circularly polarized light, the x-axis component and the y-axis component of the magnetic field of the circularly polarized light may have the same amplitude, whereas the phase of the x-axis component is different from that of the y-axis component. More specifically, the x-axis component and the y-axis component of the magnetic field of circularly polarized light may have a phase difference of 90 degrees.

A phenomenon in which the vibration directions of the electric field and the magnetic field rotate in a counterclockwise direction from an observer's viewpoint is left-circular polarization, and in the case of left-circularly polarized light, the vibration phase of the y-axis component of the magnetic field vector is 90 degrees earlier than the vibration phase of the x-axis component of the magnetic field vector. Also, a phenomenon in which the vibration directions of the electric field and the magnetic field rotate in a clockwise direction from an observer's viewpoint is right-circular polarization, and in the case of right-circularly polarized light, the vibration phase of the x-axis component of the magnetic field vector is 90 degrees earlier than the vibration phase of the y-axis component of the magnetic field vector.

As such, by delaying the phase of the x-axis component of the magnetic field of linearly polarized light by 90 degrees, or by delaying the phase of the y-axis component of the magnetic field of linearly polarized light by 90 degrees, circularly polarized light can be generated from the linearly polarized light.

The circular polarizer 123 may include a quarter wave plate or an LCM.

In the inside of the quarter wave plate, a magnetic field and an electric field may have different propagation velocities according to the respective vibration directions, and due to the difference between the propagation velocities, the quarter wave plate can delay the phase of the x-axis or y-axis component of the magnetic field of linearly polarized light by 90 degrees.

Also, the linear polarizer 122 and the circular polarizer 123 may be implemented as an LCM.

The beam splitter 124 may split incident light into a plurality of light beams.

More specifically, the beam splitter 124 may reflect a part of light circularly polarized by the circular polarizer 123 toward the indicator 200, and transmit the other part of the circularly polarized light. A ratio of the reflected light to the transmitted light may be decided as an arbitrary value. Preferably, a ratio of the reflected light to the transmitted light may be set to be 50:50.

Since the path of light is changed by the beam splitter 124, the camera 126 may not need to be aligned with the light source 121. More specifically, the circularly polarized light may be reflected by the beam splitter 124 to be incident to the indicator 200, and light reflected from the indicator 200 may pass through the beam splitter 124 to be incident to the analyzer 125.

The analyzer 125 may transmit light polarized in a specific direction. In other words, the analyzer 125 may transmit light including an electric field and a magnetic field vibrating in specific directions.

The analyzer 125 may perform the same function as the linear polarizer 122 described above, and include a polarization film to linearly polarize light, like the linear polarizer 122.

The analyzer 125 may change the polarization direction. For example, the analyzer 125 may rotate on the axis along which light is incident, and the polarization direction of the analyzer 125 may be changed by the rotation of the analyzer 125.

As a result, the polarization direction of the analyzer 125 may be identical to, or different from, the polarization direction of the linear analyzer 125.

The camera 126 may acquire light passed through the analyzer 125, and output an electrical signal corresponding to the acquired light. More specifically, the camera 126 may output an electrical signal having a voltage according to the intensity of the acquired light.

The camera 126 may include a Charge Coupled Device (CCD) imaging sensor or a Complementary Metal-Oxide Semiconductor (CMOS) imaging sensor.

Referring to FIG. 4, the path of light irradiated from the light source 121 and then incident to the camera 126 will be described below. First, light may be irradiated from the light source 121.

Then, the light irradiated from the light source 121 may be linearly polarized by the linear polarizer 122, and the linearly polarized light may be circularly polarized by the circular polarizer 123. The circularly polarized light may be incident to the indicator 200.

The light incident to the indicator 200 may pass through the photoelastic plate 210 of the indicator 200, then be reflected by the loss film 220 of the indicator 200, and then again pass through the photoelastic plate 210. However, since the light incident to the indicator 200 changes the optical characteristics while passing through the photoelastic plate 210, it will be briefly described that, or how, the light passes through the indicator 200.

The optical characteristics of a part of the indicator 200 may change by a near field formed around the target sample S. More specifically, the loss film 220 of the indicator 200 may be heated by a near field formed around the target sample S, and stress may be generated in a part of the photoelastic plate 210 of the indicator 200 due to the heat of the loss film 220.

Also, due to the stress generated in the part of the photoelastic plate 210, the optical characteristics of the part of the photoelastic plate 210 may change. For example, due to the stress generated in the part of the photoelastic plate 210, the part of the photoelastic plate 210 may change to an optically anisotropic material, and double refraction may occur in the part of the photoelastic plate 210 changed to the optically anisotropic material.

If circularly polarized light is incident to the remaining part of the photoelastic plate 210 where the optical characteristics of the photoelastic plate 210 have not changed, the circularly polarized light may pass through the photoelastic plate 210 to be output. Meanwhile, if circularly polarized light is incident to the part of the photoelastic plate 210 where the optical characteristics of the photoelastic plate 210 have changed, the circularly polarized light may be converted into elliptically polarized light due to double refraction, as shown in FIG. 5.

In other words, the indicator 200 may convert circularly polarized light into elliptically polarized light and output the elliptically polarized light at an area where the near field of the target sample S is formed, and may output the circularly polarized light as it is at the remaining area where no near field of the target sample S is formed.

As such, the circularly polarized light incident to the indicator 200 may be output as it is from the indicator 200, or converted into elliptically polarized light and then output from the indicator 200, according to whether or not a near field of the target sample S is formed.

The circularly polarized light or the elliptically polarized light output from the indicator 200 may be incident to the analyzer 125. Only light polarized in a predetermined direction among the light incident to the analyzer 125 can pass through the analyzer 125.

The camera 126 may acquire the light passed through the analyzer 125, and output an electrical signal corresponding to the intensity of the acquired light. The intensity of the light passed through the analyzer 125 may depend on whether circularly polarized light or elliptically polarized light is output from the indicator 200. For example, if the polarization direction of the analyzer 125 is identical to the major-axis direction of elliptically polarized light, the intensity of elliptically polarized light passing through the analyzer 125 may be greater than that of circularly polarized light passing through the analyzer 125.

The camera 126 may acquire first light passed through the analyzer 125 when the polarization direction of the analyzer 125 is at an angle of 45 degrees with respect to the polarization direction of the linear polarizer 122, and acquire second light passed through the analyzer 125 when the polarization direction of the analyzer 125 is at an angle of 90 degrees with respect to the polarization direction of the linear polarizer 122. The controller 110 which will be described below may image a change in optical characteristics of the indicator 200, that is, a near field of the target sample S, from the intensity of the first light and the intensity of the second light.

As described above, the optical device 120 may output circularly polarized light toward the indicator 200, and acquire light passed through the indicator 200.

The controller 110 may include memory 112 to store programs and data for controlling operations of the imaging apparatus 100, and a processor 111 to generate commands for controlling the optical device 120 and to process the output of the optical device 120.

The processor 111 may output a first image acquiring signal for controlling the analyzer 125 so that the polarization direction of the analyzer 125 is at an angle of 45 degrees with respect to the polarization direction of the linear polarizer 122, and controlling the camera 126 to acquire light passed through the analyzer 125. The camera 126 may output a first image formed by the first light passed through the analyzer 125, to the processor 111, according to the first image acquiring signal.

Also, the processor 111 may output a second image acquiring signal for controlling the analyzer 125 so that the polarization direction of the analyzer 125 is at an angle of 90 degrees with respect to the polarization direction of the linear polarizer 122, and controlling the camera 126 to acquire light passed through the analyzer 125. The camera 126 may output a second image formed by the second light passed through the analyzer 125, to the processor 111, according to the second image acquiring signal.

The processor 111 may process the first image and the second image. More specifically, the processor 111 may create an image representing a change in optical characteristics of the indicator 200, that is, a near field formed around the target sample S, from the first image and the second image. Imaging a near field formed around the target sample S will be described in detail below.

The processor 111 may store an image representing a near field formed around the target sample S in the memory 112 or the storage device 130.

The memory 112 may control operations of the light source 121, the analyzer 125, and the camera 126, and store programs and data for processing images acquired by the camera 126.

The memory 112 may include volatile memory, such as Static Random Access Memory (S-RAM) and Dynamic Random Access Memory (DRAM), and non-volatile memory, such as Read Only Memory (ROM), Erasable Programmable Read Only Memory (EPROM) and Electrically Erasable Programmable Read Only Memory (EEPROM). The non-volatile memory may store programs and data for controlling operations of the imaging apparatus 100, and the volatile memory may store images acquired by the camera 126 and images created by the processor 111.

The storage device 130 may include a magnetic disk drive 131, an optical disk drive 132, a solid state drive and the like. Also, the storage device 130 may function as an auxiliary storage device of the memory 112 included in the controller 110, and store programs and data for controlling the imaging apparatus 100.

Also, the storage device 130 may store a reference image obtained by imaging a near field formed around a standard sample, and a sample image obtained by imaging a near field formed around the target sample S. The reference image may be acquired by imaging a near field formed around a real standard sample using the imaging system 10, or through a computer simulation. The sample image may be created by the processor 111 of the controller 110, as described above.

Hereinafter, a method in which the imaging apparatus 100 images a near field formed around the target sample S will be described.

FIGS. 6A, 6B, 6C, 6D, 7A, 7B, 7C, 8A, 8B and 8C show images of samples, acquired by an imaging apparatus included in an imaging system according to exemplary embodiments of the present disclosure.

As described above, the camera 126 may output a first image formed by first light passed through the analyzer 125 when the polarization direction of the analyzer 125 is at an angle of 45 degrees from the polarization direction of the linear polarizer 122, and output a second image formed by second light passed through the analyzer 125 when the polarization direction of the analyzer 125 is at an angle of 90 degrees from the polarization direction of the linear polarizer 122.

The controller 110 may image a change in optical characteristics of the indicator 200, that is, a near field formed around a target sample S, from the first image. For example, the first image may be an image obtained by imaging a near field formed around a target sample S.

The controller 110 may image a change in optical characteristics of the indicator 200, that is, a near field formed around a target sample S, from the second image. For example, the second image may be an image obtained by imaging a near field formed around a target sample S.

Also, for more accurate imaging, the controller 110 may image a change in optical characteristics of the indicator 200, that is, a near field formed around a target sample S, from both the first image and the second image.

A change in intensity of the first light passed through the analyzer 125 when the polarization direction of the analyzer 125 is at an angle of 45 degrees with respect to the polarization direction of the linear polarizer 122, and a change in intensity of the second light passed through the analyzer 125 when the polarization direction of the analyzer 125 is at an angle of 90 degrees with respect to the polarization direction of the linear polarizer 122 may be expressed by Equation (1), below.

$$\beta_1 = \frac{2\pi dS}{\lambda}(\sigma_x - \sigma_y).$$
$$\beta_2 = \frac{2\pi dS}{\lambda}2\sigma_{xy}.$$
EQUATION (1)

where $\beta_1$ represents the intensity of the first light, $\beta_2$ represents the intensity of the second light, $\lambda$ represents the wavelength of light, S represents a stress optical coefficient and $\sigma_x$, $\sigma_y$, and $\sigma_{xy}$ represent the stresses of the indicator 200 caused by heat.

The controller 110 may calculate heat generated in the indicator 200 from the intensity $\beta_1$ of the first light and the intensity $\beta_2$ of the second light, using Equation (2) below.

$$Q = C\left(\frac{\partial^2 \beta_1}{\partial x^2} - \frac{\partial^2 \beta_1}{\partial y^2} - 2\frac{\partial^2 \beta_2}{\partial x \partial y}\right).$$
Equation (2)

where Q represents heat density of the indicator 200, C represents a constant depending on a material constituting the indicator 200, $\beta_1$ represents the intensity of the first light and $\beta_2$ represents the intensity of the second light.

By using Equation (2), the controller 110 may calculate heat density, that is, a heat distribution of each pixel, from the intensity of the first light which pixels constituting the first image represent and the intensity of the second light which pixels constituting the second image represent. The controller 110 may image heat distribution of the indicator 200 based on the heat density calculated for each pixel.

Since the indicator 200 is heated by a near field formed around the target sample S, heat distribution imaged by the controller 110 may represent a distribution of the near field formed around the target sample S. In other words, the controller 110 may image heat distribution of the indicator 200 to thereby image a near field formed around the target sample S.

In order to detect any defect of the target sample S, the controller 110 may compare a sample image of the target sample S to the reference image of the standard sample without any defect.

Figure 6A:
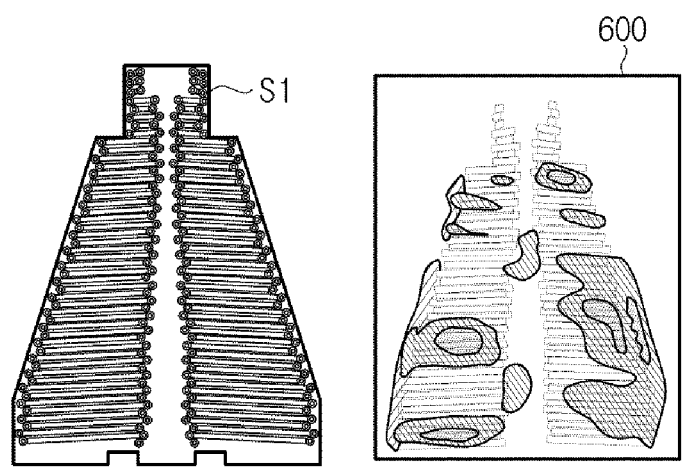

For example, the imaging apparatus 100 may image a near field formed around a standard sample S0 without any defect, as shown in FIG. 6A. More specifically, the indicator 200 may be heated by a near field of the standard sample S0, and the camera 126 may acquire an image representing heat distribution of the indicator 200. The controller 110 may create a reference image 600 representing the near field of the standard sample S0 from the image acquired by the camera 126, and store the reference image 600 in the storage device 130.

For example, the imaging apparatus 100 may image a near field formed around a first sample S1 having a defect in an area A1, as shown in FIG. 6B. More specifically, the controller 110 may create a first sample image 610 representing a near field of a first sample S1 from an image acquired by the camera 126, and store the first sample image 610 in the storage device 130. Then, the controller 110 may subtract the first sample image 610 from the reference image 600 stored in the storage device 130 to calculate a difference between the first sample image 610 and the reference image 600, create a first difference image 611 representing the difference between the first sample image 610 and the reference image 600, and store the first difference image 611 in the storage device 130. Whether the first sample S1 has any defect may be determined based on the first difference image 611.

Figure 6C:
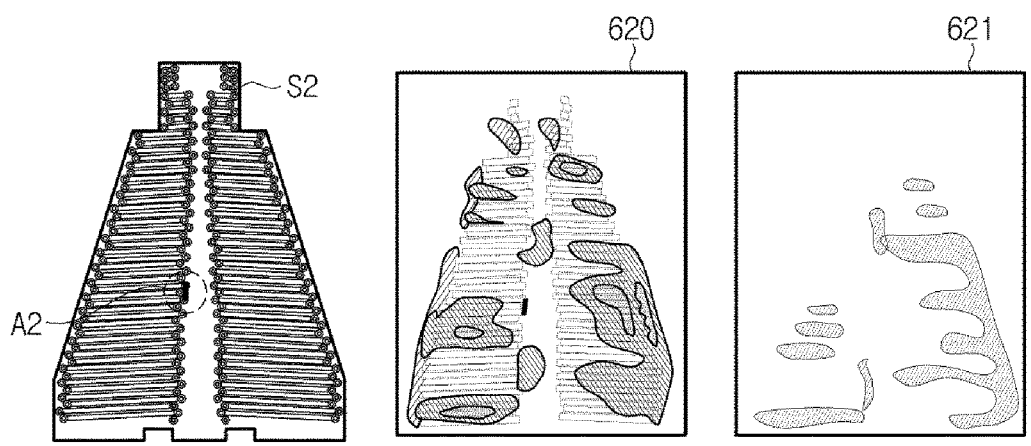

According to another example, the imaging apparatus 100 may image a near field formed around a second sample S2 having a defect in an area A2, as shown in FIG. 6C. More specifically, the controller 110 may create a second sample image 620 representing a near field of a second sample S2 from an image acquired by the camera 126, and store the second sample image 620 in the storage device 130. Also, the controller 110 may subtract the second sample image 620 from the reference image 600 stored in the storage device 130 to calculate a difference between the second sample image 620 and the reference image 600, create a second difference image 621 representing the difference between the second sample image 620 and the reference image 600, and store the second difference image 621 in the storage device 130. Whether the second sample S2 has any defect may be determined based on the second difference image 621.

Figure 6D:
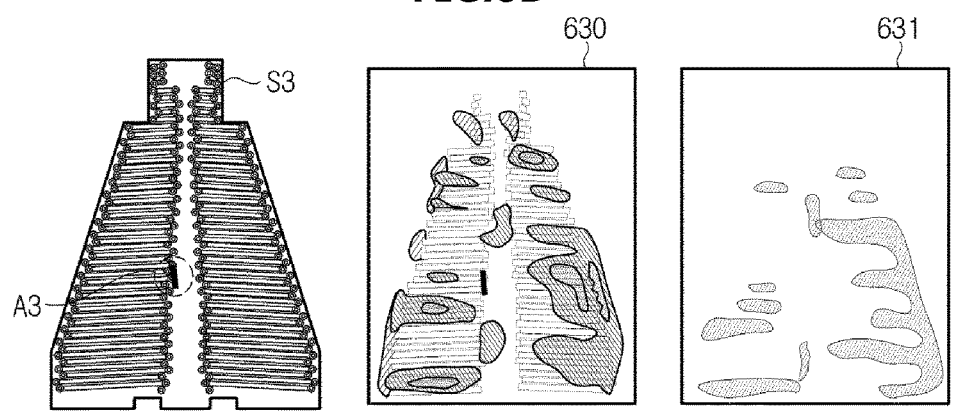

According to still another example, the imaging apparatus 100 may image a near field formed around a third sample S3 having a defect in an area A3, as shown in FIG. 6D. More specifically, the controller 110 may create a third sample image 630 representing a near field of a third sample S3 from an image acquired by the camera 126, and store the third sample image 630 in the storage device 130. Also, the controller 110 may subtract the third sample image 630 from the reference image 600 stored in the storage device 130 to calculate a difference between the third sample image 630 and the reference image 600, create a third difference image 631 representing the difference between the third sample image 630 and the reference image 600, and store the third difference image 631 in the storage device 130. Whether the third sample S3 has any defect may be determined based on the third difference image 631.

In order to determine the frequency characteristics of a target sample S that is to be examined, the controller 110 may image near fields of various frequencies formed around the target sample S. More specifically, the frequency of a signal that the transmitter 400 supplies to the target sample S may be controlled, and a near field according to the frequency of the signal supplied by the transmitter 400 may be formed around the target sample S.

Figure 7A:
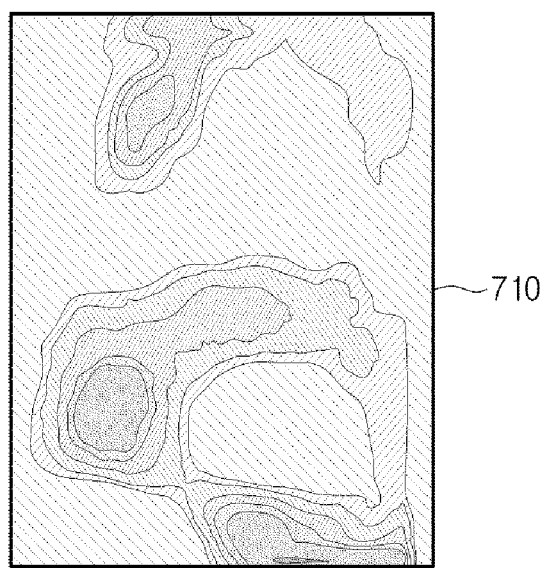

For example, the transmitter 400 may supply a signal having a frequency of 105 MHz to a standard sample S0, and the imaging apparatus 100 may image a near field formed around the standard sample S0. The indicator 200 may be heated by the near field having the frequency of 105 MHz and formed around the standard sample S0, and the camera 126 may acquire an image representing heat distribution of the indicator 200. The controller 110 may create a reference image 710 according to a first frequency, as shown in FIG. 7A, from the image acquired by the camera 126, and store the reference image 710 according to the first frequency in the storage device 130.

Figure 7B:
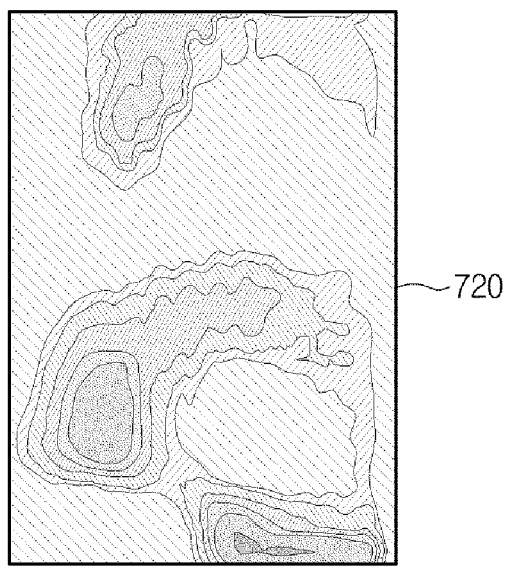

Also, the transmitter 400 may supply a signal having a frequency of 106 MHz to the standard sample S0, and the imaging apparatus 100 may image a near field formed around the standard sample S0. The indicator 200 may be heated by the near field having the frequency of 106 MHz and formed around the standard sample S0, and the camera 126 may acquire an image representing heat distribution of the indicator 200. The controller 110 may create a reference image 720 according to a second frequency, as shown in FIG. 7B, from the image acquired by the camera 126, and store the reference image 720 according to the second frequency in the storage device 130.

Figure 7C:
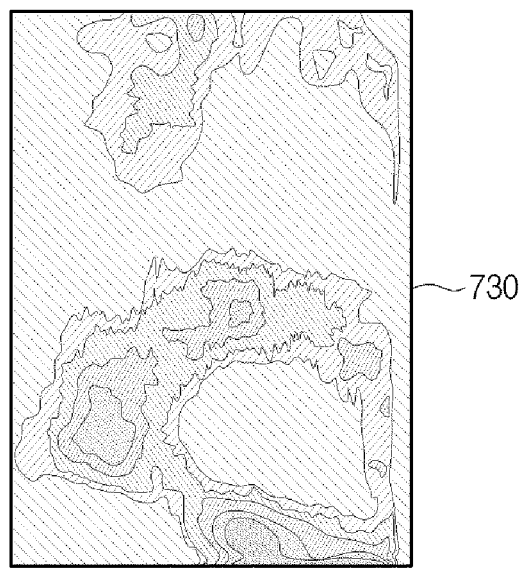

Also, the transmitter 400 may supply a signal having a frequency of 107 MHz to the standard sample S0, and the imaging apparatus 100 may image a near field formed around the standard sample S0. The indicator 200 may be heated by the near field having the frequency of 107 MHz and formed around the standard sample S0, and the camera 126 may acquire an image representing a heat distribution of the indicator 200. The controller 110 may create a reference image 730 according to a third frequency, as shown in FIG. 7C, from the image acquired by the camera 126, and store the reference image 730 according to the third frequency in the storage device 130.

The frequency characteristics of the standard sample S0 may be determined from the reference image 710 according to the first frequency, the reference image 720 according to the second frequency, and the reference image 730 according to the third frequency.

In order to determine a 3Dimensional (3D) shape of a near field formed around a target sample S, the controller 110 may image near fields formed at different distances from the target sample S.

Figure 8A:
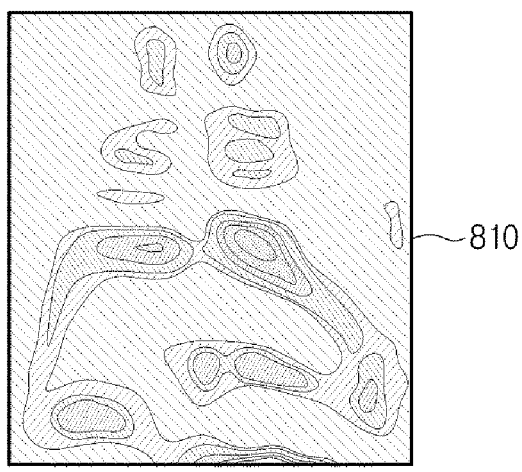

For example, the indicator 200 may be positioned at the same location as the standard sample S0, and the imaging apparatus 100 may image a near field formed at the location of the standard sample S0. The indicator 200 may be heated by the near field formed at the location of the standard sample S0, and the camera 126 may acquire an image representing heat distribution of the indicator 200. The controller 110 may create a reference image 810 at a first distance, as shown in FIG. 8A, from the image acquired by the camera 126, and store the reference image 810 at the first distance in the storage device 130.

Figure 8B:
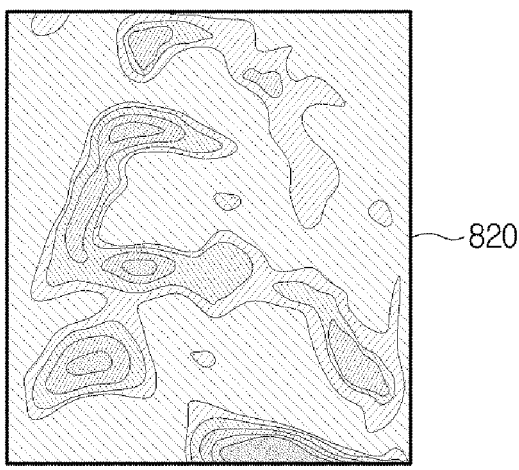

Also, the indicator 200 may be spaced 4 mm apart from the standard sample S0, and the imaging apparatus 100 may image a near field formed at a distance of 4 mm from the standard sample S0. The indicator 200 may be heated by the near field formed at the distance of 4 mm from the standard sample S0. The indicator 200 may be heated by the near field formed at the distance of 4 mm from the standard sample S0, and the camera 126 may acquire an image representing heat distribution of the indicator 200. The controller 110 may create a reference image 820 at a second distance, as shown in FIG. 8B, from the image acquired by the camera 126, and store the reference image 820 at the second distance in the storage device 130.

Figure 8C:
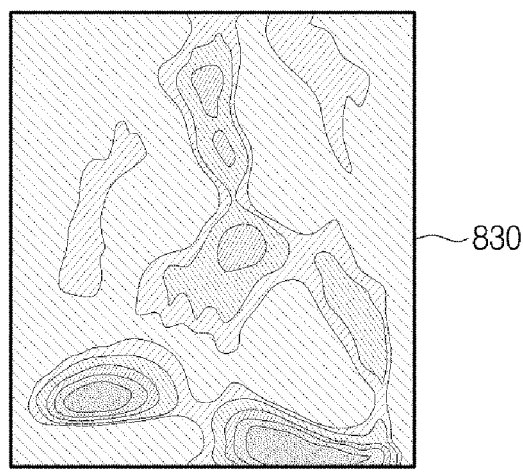

Also, the indicator 200 may be spaced 8 mm apart from the standard sample S0, and the imaging apparatus 100 may image a near field formed at a distance of 8 mm from the standard sample S0. The indicator 200 may be heated by the near field formed at the distance of 8 mm from the standard sample S0, and the camera 126 may acquire an image representing heat distribution of the indicator 200. The controller 110 may create a reference image 830 at a third distance, as shown in FIG. 8C, from the image acquired by the camera 126, and store the reference image 830 at the third distance in the storage device 130.

The shape of the near field formed around the standard sample S0 may be determined from the reference image 810 at the first distance, the reference image 820 at the second distance, and the reference image 830 at the third distance.

The imaging system 10 has been described above. The imaging system 10 may image a near field formed around a target sample S that is to be examined.

Particularly, the imaging system 10 may image a near field formed around an antenna. For example, the imaging system 10 may image a near field formed around a vehicle antenna.

Figure 9:
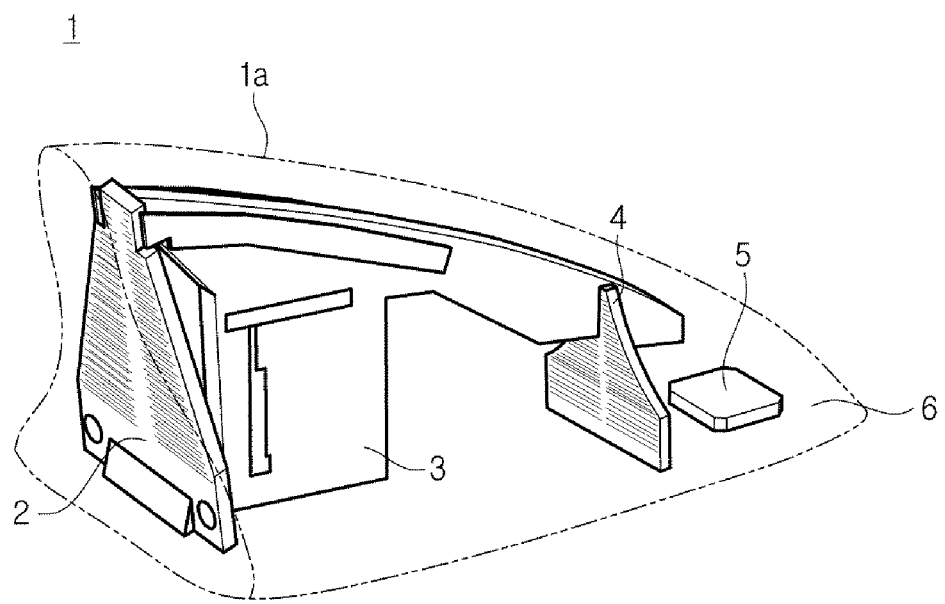
FIG. 9 shows an example of a vehicle antenna.
Figure 10:
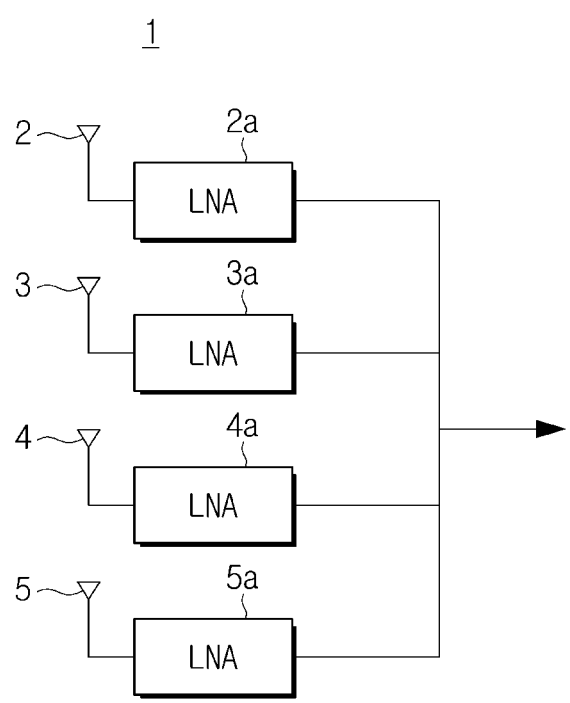
FIG. 10 shows a schematic example of a configuration of a vehicle antenna.

FIG. 9 shows an example of a vehicle antenna. Also, FIG. 10 shows an example of a configuration of a vehicle antenna.

A vehicle antenna 1 may include a plurality of antennas 2, 3, 4 and 5, and a plurality of Low Noise Amplifiers (LNAs) 2a, 3a, 4a and 5a.

The plurality of antennas 2, 3, 4 and 5 may be installed in the inside of a main body 1a of the antenna 1 to radiate radio waves to a free space and receive radio waves from the free space.

Since different frequencies of radio waves are transmitted according to data to be transmitted, service providers, transmission distances, etc., the plurality of antennas 2, 3, 4 and 5 may be installed in the antenna 1.

For example, the plurality of antennas 2, 3, 4 and 5 may include a Frequency Modulation (FM) radio antenna 2 to receive FM radio broadcasting signals, a mobile communication antenna 3 to receive mobile communication (for example, Code Division Multiple Access (CDMA), Wideband Code Division Multiple Access (WCDMA), Long Term Evolution (LTE), etc.) signals, a Digital Multimedia Broadcasting (DMB) antenna 4 to receive DMB signals, and a Global Positioning System (GPS) antenna 5 to receive GPS signals from GPS satellites.

Also, the plurality of LNAs 2a, 3a, 4a and 5a may be disposed to respectively correspond to the plurality of antennas 2, 3, 4 and 5. The plurality of LNAs 2a, 3a, 4a and 5a may amplify signals received through the corresponding antennas 2, 3, 4 and 5, and transfer the amplified signals to a broadcasting apparatus (not shown) or a communication apparatus (not shown). Particularly, in order to amplify the signals received through the antennas 2, 3, 4 and 5 before the signals attenuate, the plurality of LNAs 2a, 3a, 4a and 5a may be installed in the antenna 1 together with the plurality of antennas 2, 3, 4 and 5.

As described above, the antenna 1 may be fabricated by integrating the plurality of LNAs 2a, 3a, 4a and 5a into the plurality of antennas 2, 3, 4 and 5.

Hereinafter, an imaging system of imaging a near field formed around the antenna 1 will be described.

Figure 11:
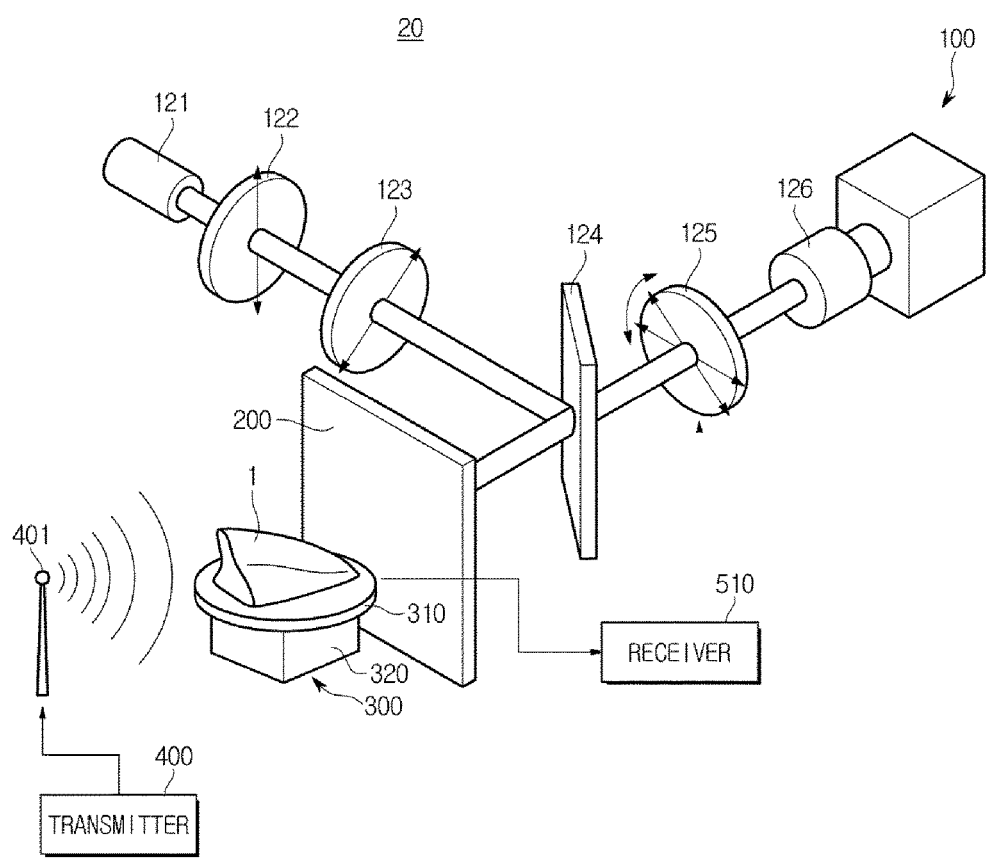
FIG. 11 shows another example of an imaging system according to exemplary embodiments of the present disclosure.

FIG. 11 shows another example of an imaging system according to exemplary embodiments of the present disclosure.

As shown in FIG. 11, an imaging system 20 may include the indicator 200 installed around the antenna 1, the imaging apparatus 100 configured to acquire an image of the indicator 200, a support table 300 on which the antenna 1 is placed, the transmitter 400 configured to radiate radio waves through a test antenna 401, and a receiver 510 configured to receive signals from the antenna 1.

The indicator 200 may be partially heated by a near field formed around the antenna 1, and due to the partial heating of the indicator 200, the optical characteristics of the indicator 200 may change. Details about the configuration and operations of the indicator 200 are the same as those of the indicator 200 described above with reference to FIGS. 1 to 5, and accordingly, detailed descriptions for the indicator 200 will be omitted.

The imaging apparatus 100 may include the light source 121, the linear polarizer 122, the circular polarizer 123, the beam splitter 124, the analyzer 125 and the camera 126. Details about the configuration and operations of the imaging apparatus 100 are the same as those of the imaging apparatus 100 described above with reference to FIGS. 1 to 5, and accordingly, detailed descriptions for the imaging apparatus 100 will be omitted.

The support table 300 may include a movable plate 310 on which the antenna 1 is placed, and a driving member 320 configured to translate or rotate the movable plate 310.

The movable plate 310 may support and fix the antenna 1, and may be moved in a front/back/left/right direction or rotated in a clockwise/counterclockwise direction by the driving member 320. Also, the driving member 320 may support the movable plate 310, and move the movable plate 310 in the front/back/left/right direction or rotate the movable plate 310 in the clockwise/counterclockwise direction.

The antenna 1 may be rotated by the support table 300 around the indicator 200, or moved away from or close to the indicator 200 by the support table 300. As a result, the imaging apparatus 100 may image near fields formed around the antenna 1 at various distances and in various directions from the antenna 1.

The antenna 1 may include a plurality of antennas and a plurality of LNAs, like the antenna 1 described above with reference to FIGS. 9 and 10. The LNAs may amplify signals received from the antennas, and transfer the amplified signals to a broadcasting apparatus (not shown) or a communication apparatus (not shown), as described above. Generally, the LNAs may be designed to transfer signals unidirectionally. In other words, although the LNAs can transfer signals received from the antennas to a broadcasting apparatus or a communication apparatus, the LNAs cannot transfer signals received from the broadcasting apparatus or the communication apparatus to the antennas. Accordingly, it is difficult to supply signals to the antenna 1 such that the antenna 1 radiates radio waves to form a near field around the antenna 1.

For this reason, the imaging system 20 may include the transmitter 400 and the receiver 510.

The transmitter 400 may generate a signal of a radio frequency, and radiate radio waves through the test antenna 401. The frequency of radio waves radiated through the test antenna 401 may be a frequency of operating any one of the plurality of antennas 2, 3, 4 and 5 included in the antenna 1. In other words, any one of the plurality of antennas 2, 3, 4 and 5 may receive radio waves radiated through the test antenna 401.

As such, if one of the antennas 2, 3, 4 and 5 included in the antenna 1 receives radio waves, a near field may be induced around the corresponding antenna. For example, if radio waves having the operating frequency of an antenna are received, an electrical signal may be generated from the antenna by the radio waves, and radio waves may be induced around the antenna by the electrical signal of the antenna. In this way, when an antenna receives radio waves, a near field may be formed around the antenna.

The indicator 200 may be partially heated by the near field formed around the antenna of the antenna 1, and the optical characteristics of the heated part of the indicator 200 may change. The imaging apparatus 100 may image the change in optical characteristics of the indicator 200. As a result, the imaging apparatus 100 may image the near field formed around the antenna of the antenna 1.

The receiver 510 may receive a signal from the antenna 1. Radio waves, that is, an electromagnetic field may be converted into an electrical signal by the antenna 1, and the electrical signal may be received by the receiver 510. The receiver 510 may prevent distortion of a near field formed around the antenna 1. In other words, if there is no receiver 510, a signal received by the antenna 1 may be reflected at the end of the antenna 1, and due to the reflection signal, the near field formed around the antenna 1 may be distorted.

The receiver 510 may include a resistive load to absorb a signal transferred from the antenna 1, or a load having the same impedance as a waveguide through which signals are transmitted.

Radio waves radiated from the transmitter 400 through the test antenna 401 may generate an electrical signal in an antenna included in the antenna 1. The electrical signal generated in the antenna 1 may be received by the receiver 510. At this time, a near field may be formed around the antenna included in the antenna 1, and the imaging apparatus 100 may image the near field formed around the antenna of the antenna 1.

As described above, in order to image the near field formed around the antenna 1 including the antennas 2, 3, 4 and 5 and the LNAs 2a, 3a, 4a and 5a, the imaging system 20 may include the transmitter 400 and the receiver 510, together with the indicator 200 and the imaging apparatus 100. Also, in order to image near fields formed around the antenna 1 at various distances and in various directions from the antenna 1, the imaging system 20 may further include the support table 300.

Figure 12:
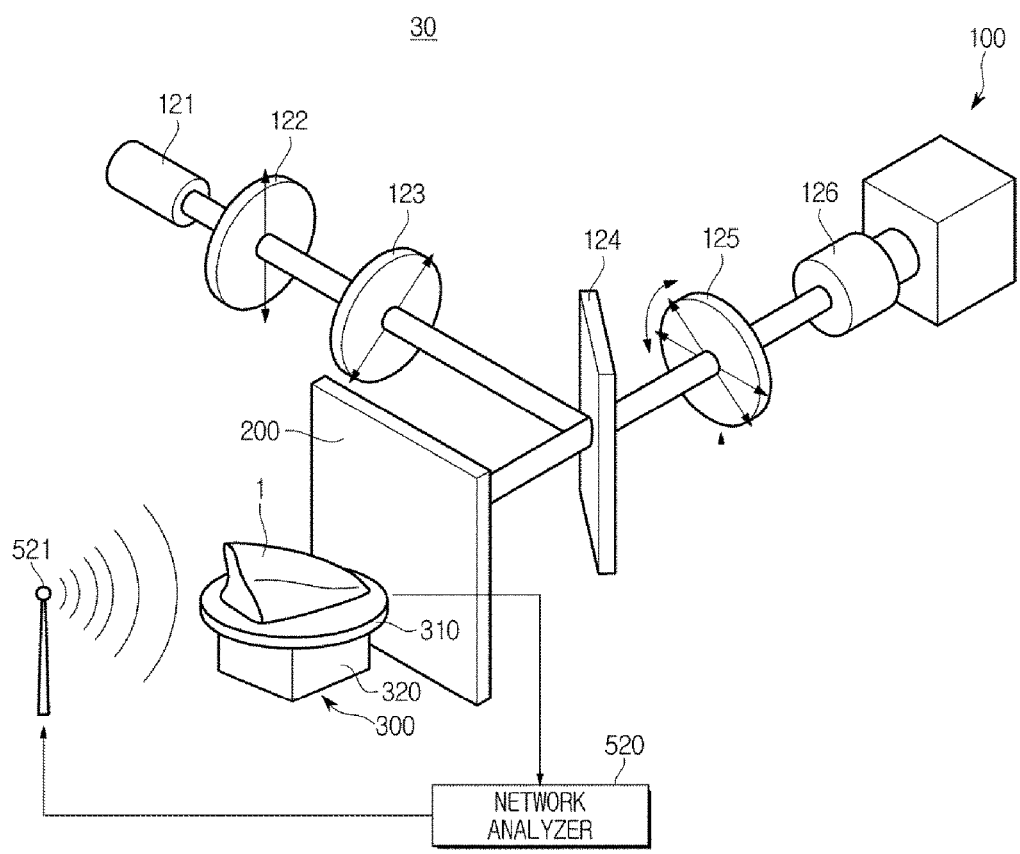
FIG. 12 shows another example of an imaging system according to exemplary embodiments of the present disclosure.

FIG. 12 shows another example of an imaging system according to exemplary embodiments of the present disclosure.

As shown in FIG. 12, an imaging system 30 may include the indicator 200 installed around the antenna 1, the imaging apparatus 100 configured to acquire an image of the indicator 200, the support table 300 on which the antenna 1 is placed, and a network analyzer 520 configured to radiate radio waves through a test antenna 521 and to receive a signal from the antenna 1.

The indicator 200 may be partially heated by a near field formed around the antenna 1, and due to the partial heating of the indicator 200, the optical characteristics of the indicator 200 may change. Details about the configuration and operations of the indicator 200 are the same as those of the indicator 200 described above with reference to FIGS. 1 to 5, and accordingly, detailed descriptions for the indicator 200 will be omitted.

The imaging apparatus 100 may include the light source 121, the linear polarizer 122, the circular polarizer 123, the beam splitter 124, the analyzer 125 and the camera 126, and may image a change in optical characteristics of the indicator 200. Details about the configuration and operations of the imaging apparatus 100 are the same as those of the imaging apparatus 100 described above with reference to FIGS. 1 to 5, and accordingly, detailed descriptions for the imaging apparatus 100 will be omitted.

The support table 300 may include the movable plate 310 and the driving member 320, and may move the antenna 1 in the front/back/left/right direction, or rotate the antenna 1. Details about the configuration and operations of the support table 300 are the same as those of the support table 300 described above with reference to FIG. 11, and accordingly, detailed descriptions for the support table 300 will be omitted.

The antenna 1 may include a plurality of antennas and a plurality of LNAs, like the antenna 1 described above with reference to FIGS. 9 and 10. Also, due to the LNAs, it is difficult to supply signals to the antenna 1 such that the antenna 1 radiates radio waves.

For this reason, the imaging system 30 may include the network analyzer 520.

The network analyzer 520 may generate a signal of a radio frequency, and radiate radio waves through the test antenna 521. Also, the network analyzer 520 may receive a signal from the antenna 1.

Unlike the transmitter 400 (see FIG. 11) and the receiver 510 (see FIG. 11) described above, the network analyzer 520 may generate and radiate signals of various frequencies, and analyze a signal received from the antenna 1.

For example, the network analyzer 520 may transmit radio waves having the operating frequency of any one of the plurality of antennas 2, 3, 4 and 5, through the test antenna 521, and analyze a signal received from the antenna 1.

As another example, the network analyzer 520 may change the frequency of radio waves to be transmitted through the test antenna 521, and sense the intensity of a signal received through the antenna 1. Thereby, the network analyzer 520 may calculate a reception rate of the antenna 1 according to frequency. Furthermore, the network analyzer 520 may calculate a reflection coefficient of the antenna 1.

Also, while the antenna 1 is rotated by the support table 300, the network analyzer 520 may sense the intensities of signals received through the antenna 1. Thereby, the network analyzer 520 may calculate reception rates of the antenna 1 according to the reception directions of the antenna 1. Furthermore, the network analyzer 520 may calculate a radiation pattern of the antenna 1.

In order to image a near field formed around the antenna 1 including the antennas and the LNAs, as described above, the imaging system 30 may include the network analyzer 520, together with the indicator 200 and the imaging apparatus 100. While the imaging apparatus 100 images a near field formed around the antenna 1, the network analyzer 520 may calculate a reflection coefficient and a radiation pattern of the antenna 1.

Figure 13:
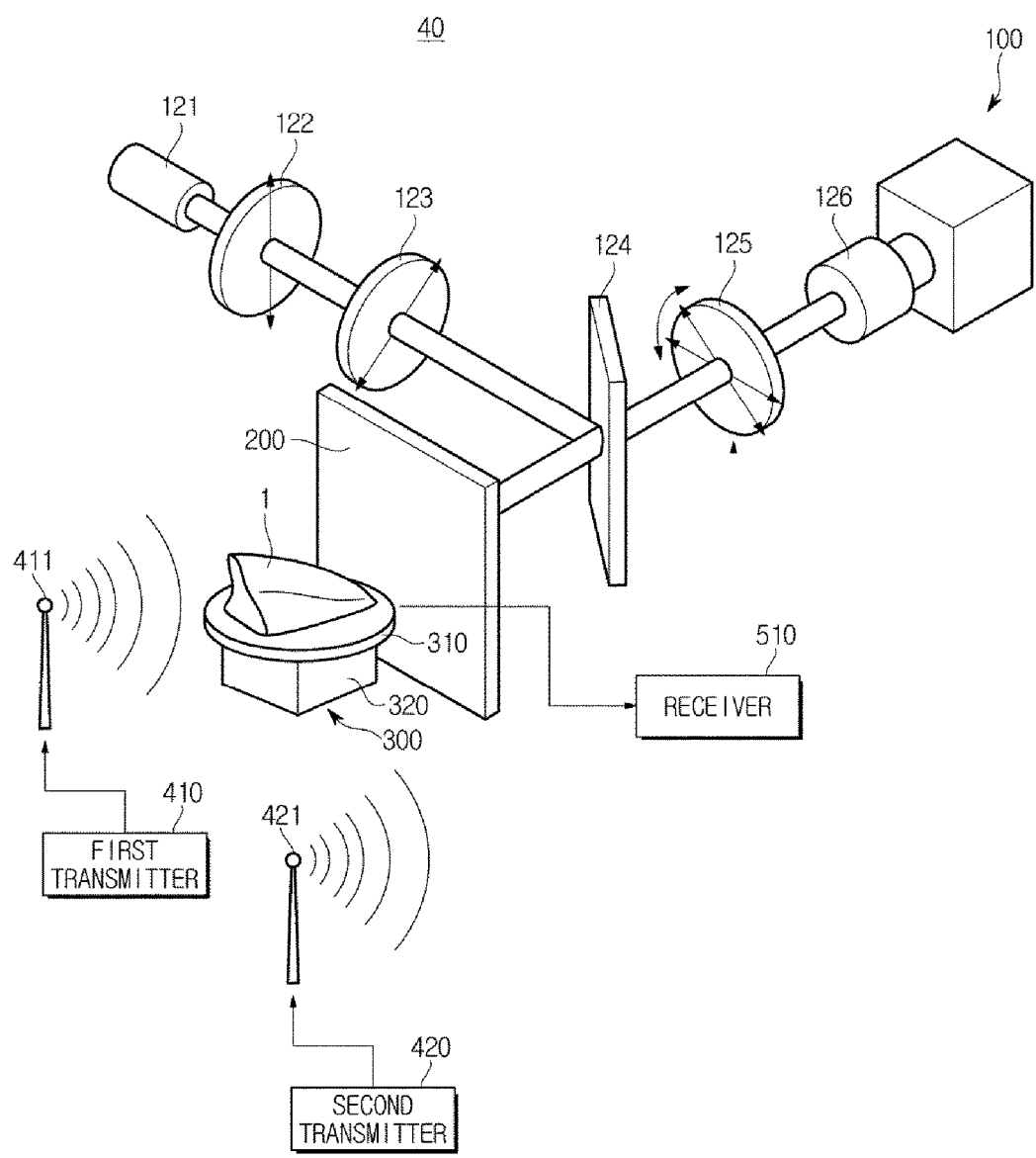
FIG. 13 shows another example of an imaging system according to exemplary embodiments of the present disclosure.

FIG. 13 shows another example of an imaging system according to exemplary embodiments of the present disclosure.

As shown in FIG. 13, an imaging system 40 may include the indicator 200 installed around the antenna 1, the imaging apparatus 100 configured to acquire an image of the indicator 200, the support table 300 on which the antenna 1 is placed, a first transmitter 410 to radiate radio waves through a first test antenna 411, a second transmitter 420 to radiate radio waves through a second test antenna 421 and the receiver 510 to receive a signal from the antenna 1.

The indicator 200 may be partially heated by a near field formed around the antenna 1, and due to the partial heating of the indicator 200, the optical characteristics of the indicator 200 may change. Details about the configuration and operations of the indicator 200 are the same as those of the indicator 200 described above with reference to FIGS. 1 to 5, and accordingly, detailed descriptions for the indicator 200 will be omitted.

The imaging apparatus 100 may include the light source 121, the linear polarizer 122, the circular polarizer 123, the beam splitter 124, the analyzer 125 and the camera 126, and may image a change in optical characteristics of the indicator 200. Details about the configuration and operations of the imaging apparatus 100 are the same as those of the imaging apparatus 100 described above with reference to FIGS. 1 to 5, and accordingly, detailed descriptions for the imaging apparatus 100 will be omitted.

The support table 300 may include the movable plate 310 and the driving member 320, and may move the antenna 1 in the front/back/left/right direction, or rotate the antenna 1. Details about the configuration and operations of the support table 300 are the same as those of the support table 300 described above with reference to FIG. 11, and accordingly, detailed descriptions for the support table 300 will be omitted.

The antenna 1 may include a plurality of antennas and a plurality of LNAs, like the antenna 1 described above with reference to FIGS. 9 and 10. Also, due to the LNAs, it is difficult to supply signals to the antenna 1 such that the antenna 1 radiates radio waves.

For this reason, the imaging system 40 may include the first transmitter 410, the second transmitter 420 and the receiver 510.

The first transmitter 410 may generate a signal of a first radio frequency, and radiate radio waves of the first radio frequency through the first test antenna 411. Also, the second transmitter 420 may generate a signal of a second radio frequency, and radiate radio waves of the second radio frequency through the second test antenna 421.

As described above, the antenna 1 may include the plurality of antennas 2, 3, 4 and 5, and the plurality of antennas 2, 3, 4 and 5 may operate at different frequencies, respectively.

The imaging system 40 may include the first transmitter 410 to radiate radio waves of the first radio frequency and the second transmitter 420 to radiate radio waves of the second radio frequency, in order to image near fields formed around at least two antennas of the plurality of antennas 2, 3, 4 and 5 included in the antenna 1.

Since the imaging system 40 includes the first transmitter 410 and the second transmitter 420, the imaging system 40 can image interference between the plurality of antennas 2, 3, 4 and 5. Since the plurality of antennas 2, 3, 4 and 5 are integrated into the antenna 1, interference between the plurality of antennas 2, 3, 4 and 5 may occur. For example, a near field of the mobile communication antenna 3 may be changed by a near field of the FM radio antenna 2, and the near field of the FM radio antenna 2 may be changed by the near field of the mobile communication antenna 3.

The imaging apparatus 100 may image the near fields formed around the FM radio antenna 2 and the mobile communication antenna 3, and also image a near field formed by interference between the FM radio antenna 2 and the mobile communication antenna 3.

The receiver 510 may receive a signal from the antenna 1. Details about the configuration and operations of the receiver 510 are the same as those of the receiver 510 described above with reference to FIG. 11, and accordingly, detailed descriptions for the receiver 510 will be omitted.

As described above, the imaging system 40 may include the first transmitter 410, the second transmitter 420, and the receiver 510, together with the indicator 200 and the imaging apparatus 100, in order to image a near field formed around the antenna 1 including the antennas 2, 3, 4 and 5 and the LNAs 2a, 3a, 4a and 5a. The imaging system 40 may image near fields of the plurality of antennas 2, 3, 4 and 5 included in the antenna 1, and also image interference between the plurality of antennas 2, 3, 4 and 5.

Figure 14:
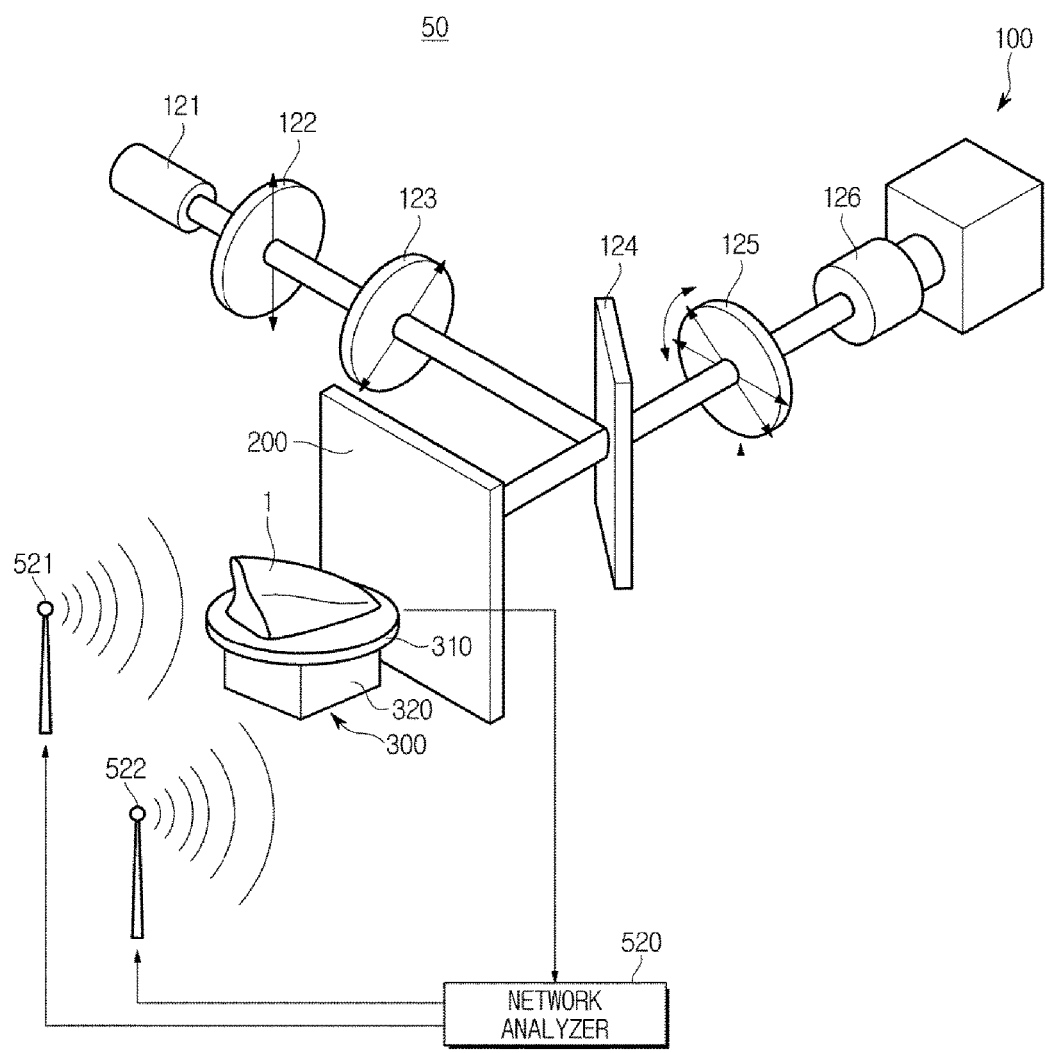
FIG. 14 shows another example of an imaging system according to exemplary embodiments of the present disclosure.

FIG. 14 shows another example of an imaging system according to exemplary embodiments of the present disclosure.

As shown in FIG. 14, an imaging system 50 may include the indicator 200 installed around the antenna 1, the imaging apparatus 100 configured to acquire an image of the indicator 200, the support table 300 on which the antenna 1 is placed and the network analyzer 520 to radiate radio waves through first and second test antennas 521 and 522 and to receive a signal from the antenna 1.

The indicator 200 may be partially heated by a near field formed around the antenna 1, and due to the partial heating of the indicator 200, the optical characteristics of the indicator 200 may change. Details about the configuration and operations of the indicator 200 are the same as those of the indicator 200 described above with reference to FIGS. 1 to 5, and accordingly, detailed descriptions for the indicator 200 will be omitted.

The imaging apparatus 100 may include the light source 121, the linear polarizer 122, the circular polarizer 123, the beam splitter 124, the analyzer 125 and the camera 126, and may image a change in optical characteristics of the indicator 200. Details about the configuration and operations of the imaging apparatus 100 are the same as those of the imaging apparatus 100 described above with reference to FIGS. 1 to 5, and accordingly, detailed descriptions for the imaging apparatus 100 will be omitted.

The support table 300 may include the movable plate 310 and the driving member 320, and may move the antenna 1 in the front/back/left/right direction, or rotate the antenna 1. Details about the configuration and operations of the support table 300 are the same as those of the support table 300 described above with reference to FIG. 11, and accordingly, detailed descriptions for the support table 300 will be omitted.

The antenna 1 may include a plurality of antennas and a plurality of LNAs, like the antenna 1 described above with reference to FIGS. 9 and 10. Also, due to the LNAs, it is difficult to supply signals to the antenna 1 such that the antenna 1 radiates radio waves.

For this reason, the imaging system 50 may include the network analyzer 520.

The network analyzer 520 may generate signals of first and second radio frequencies, and radiate radio waves through the first and second test antennas 521 and 522. Also, the network analyzer 520 may receive a signal from the antenna 1.

For example, the network analyzer 520 may transmit radio waves of the first and second radio frequencies through the first and second test antennas 521 and 522, and analyze a signal received from the antenna 1.

The network analyzer 520 may sense a change of the received signal due to interference between the plurality of antennas 2, 3, 4 and 5. For example, the network analyzer 520 may transmit radio waves of the FM radio frequency and radio waves of the mobile communication frequency through the first and second test antennas 521 and 522, and sense a change of a received signal due to interference between the FM radio antenna 2 and the mobile communication antenna 3.

In other words, the imaging apparatus 100 of the imaging system 50 may image interference between the plurality of antennas 2, 3, 4 and 5, and the network analyzer 520 of the imaging system 50 may sense a change of a received signal due to the interference between the plurality of antennas 2, 3, 4 and 5.

As described above, the imaging system 40 may include the network analyzer 520, together with the indicator 200 and the imaging apparatus 100, in order to image a near field formed around the antenna 1 including the antennas 2, 3, 4 and 5 and the LNAs 2a, 3a, 4a and 5a. The imaging system 40 may image interference between the plurality of antennas 2, 3, 4 and 5 included in the antenna 1, and also sense a change of a received signal due to the interference between the plurality of antennas 2, 3, 4 and 5.

Figure 15:
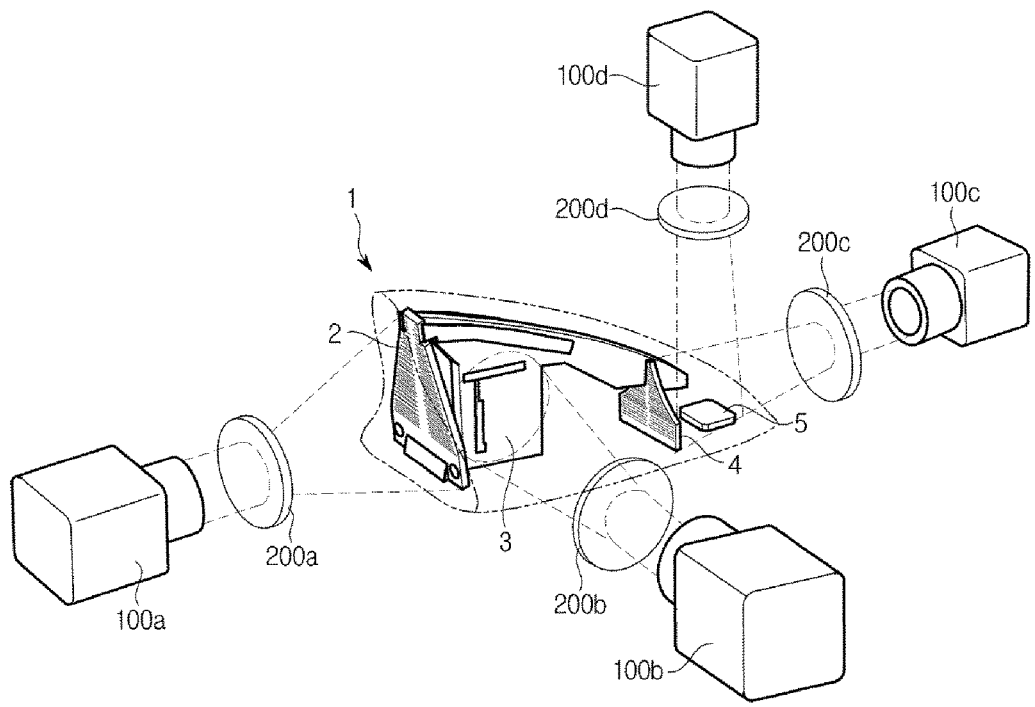
FIG. 15 shows another example of an imaging system according to exemplary embodiments of the present disclosure.

FIG. 15 shows another example of an imaging system according to exemplary embodiments of the present disclosure.

As shown in FIG. 15, an imaging system 50 may include a plurality of indicators 200a, 200b, 200c and 200d, and a plurality of imaging apparatuses 100a, 100b, 100c and 100d.

The plurality of indicators 200a, 200b, 200c and 200d may be partially heated by near fields respectively formed around the plurality of antennas 2, 3, 4 and 5 included in the antenna 1, and due to the partial heating of the indicators 200a, 200b, 200c and 200d, the optical characteristics of the indicators 200a, 200b, 200c and 200d may change.

For example, the optical characteristics of a part of the first indicator 200a may change by a near field of the FM radio antenna 2, and the optical characteristics of a part of the first indicator 200b may change by a near field of the mobile communication antenna 3. Also, the optical characteristics of a part of the third indicator 200c may change by a near field of the DMB antenna 4, and the optical characteristics of a part of the fourth indicator 200d may change by a near field of the GPS antenna 5.

Also, the plurality of imaging apparatuses 100a, 100b, 100c and 100d may image changes in optical characteristics of the plurality of indicators 200a, 200b, 200c and 200d, respectively. For example, the first imaging apparatus 100a may image a change in optical characteristics of the part of the first indicator 200a, and the second imaging apparatus 100b may image a change in optical characteristics of the part of the second indicator 200b. Also, the third imaging apparatus 100c may image a change in optical characteristics of the part of the third indicator 200c, and the fourth imaging apparatus 100d may image a change in optical characteristics of the part of the fourth indicator 200d.

As such, since the imaging system 60 includes the plurality of indicators 200a, 200b, 200c and 200d and the plurality of imaging apparatuses 100a, 100b, 100c and 100d, the imaging system 60 can simultaneously image near fields respectively formed around the plurality of antennas 2, 3, 4 and 5 included in the antenna 1.

The imaging system 60 may image near fields formed around the antenna 1, simultaneously, in various directions.

For example, as shown in FIG. 15, the first imaging apparatus 100a and the first indicator 200a may image a near field formed around the antenna 1, behind the antenna 1, and the second imaging apparatus 100b and the second indicator 200b may image a near field formed around the antenna 1, beside the antenna 1. Also, the third imaging apparatus 100c and the third indicator 200c may image a near field formed around the antenna 1, in front of the antenna 1, and the fourth imaging apparatus 100d and the fourth indicator 200d may image a near field formed around the antenna 1, above the antenna 1.

As such, since the imaging system 60 includes the plurality of indicators 200a, 200b, 200c and 200d and the plurality of imaging apparatuses 100a, 100b, 100c and 100d, the imaging system 60 can image near fields formed around the antenna 1, simultaneously, in various directions.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An imaging system comprising:
   an indicator installed around an antenna, wherein optical characteristics of the indicator change as a function of an electromagnetic field formed by the antenna;
   an imaging apparatus for imaging a change in optical characteristics of the indicator;
   a transmitter for radiating radio waves toward the antenna; and
   a receiver for receiving a signal from the antenna.

2. The imaging system according to claim 1, wherein the indicator comprises:
   a loss film which is partially heated by the electromagnetic field formed by the antenna; and
   a photoelastic plate, wherein optical characteristics of a part of the photoelastic plate change by the partial heating of the loss film.

3. The imaging system according to 2, wherein the photoelastic plate is partially heated by the partial heating of the loss film, and optical characteristics of the partially heated part of the photoelastic plate change according to a photoelastic effect.

4. The imaging system according to claim 3, wherein double refraction occurs in the part of the photoelastic plate where the optical characteristics of the photoelastic plate change.

5. The imaging system according to claim 1, wherein the imaging apparatus comprises:
   a light source for generating light;
   a linear polarizer for linearly polarizing the light generated by the light source;
   a circular polarizer for circularly polarizing the linearly polarized light;
   a beam splitter for causing the circularly polarized light to be incident to the indicator;
   an analyzer for linearly polarizing light passed through the indicator; and
   a camera for receiving light passed through the analyzer.

6. The imaging system according to claim 5, wherein light passed through a part of the indicator where the optical characteristics of the indicator change is elliptically polarized.

7. The imaging system according to claim 5, wherein the imaging apparatus further comprises:
   a controller for processing an image acquired by the camera, and creating a sample image representing an electromagnetic field formed by the antenna; and
   a storage device for storing the sample image representing the electromagnetic field formed by the antenna.

8. The imaging system according to claim 7, wherein the camera acquires a first image when a polarization direction of the analyzer is at an angle of 45 degrees with respect to a polarization direction of the linear polarizer, and the camera acquires a second image when the polarization direction of the analyzer is at an angle of 90 degrees with respect to the polarization direction of the linear polarizer.

9. The imaging system according to claim 8, wherein the controller generates the sample image representing the electromagnetic field formed by the antenna from the first image and the second image.

10. The imaging system according to claim 7, wherein the controller generates a difference image representing a difference between the sample image and a reference image stored in the storage device.

11. The imaging system according to claim 7, wherein the transmitter sequentially radiates radio waves having different frequencies, and the controller generates a plurality of images representing the electromagnetic field formed by the antenna according to the radio waves having the different frequencies.

12. The imaging system according to claim 7, further comprising a support table for translating the antenna,
   wherein the controller generates a plurality of images representing the electromagnetic field formed by the antenna according to a plurality of different distances between the antenna and the indicator.

13. The imaging system according to claim 7, further comprising a support table for rotating the antenna,
   wherein the controller generates a plurality of images representing the electromagnetic field formed by the antenna by rotating the antenna.

14. The imaging system according to claim 1, further comprising another transmitter for radiating radio waves having a frequency that is different from a frequency of the radio waves radiated from the transmitter.

15. The imaging system according to claim 14, wherein when the transmitter and the other transmitter radiate the radio waves of the different frequencies, the imaging apparatus images an electromagnetic field formed by a plurality of antennas included in the antenna.

16. An imaging system comprising:
   an indicator disposed around an antenna, wherein optical characteristics of the indicator change as a function of an electromagnetic field formed by the antenna;
   an imaging apparatus for imaging a change in optical characteristics of the indicator; and
   a network analyzer for radiating radio waves toward the antenna, and for receiving a signal from the antenna.

17. The imaging system according to claim 16, wherein the network analyzer senses an intensity of the signal received from the antenna while changing a frequency of the electromagnetic waves, and calculates a reception rate of the antenna according to frequency based on the sensed intensity of the signal.

18. The imaging system according to claim 16, further comprising a support table for rotating the antenna,
   wherein the network analyzer senses intensity of the signal received from the antenna while the support table rotates the antenna, and calculates a radiation pattern of the antenna based on the sensed intensity of the signal.

19. The imaging system according to claim 16, wherein the network analyzer simultaneously radiates a plurality of radio waves having different frequencies and receives a signal from a plurality of antennas included in the antenna.

* * * * *